(12) United States Patent
Trinschek et al.

(10) Patent No.: US 9,474,112 B2
(45) Date of Patent: Oct. 18, 2016

(54) DIMMABLE LED READING LIGHT UNIT, ARRANGEMENT OF POWER SUPPLY AND DIMMABLE LED READING LIGHT UNIT AND METHOD OF REPLACING A DIMMABLE LIGHT UNIT BY A DIMMABLE LED READING LIGHT UNIT

(71) Applicant: GOODRICH LIGHTING SYSTEMS GMBH, Lippstadt (DE)

(72) Inventors: Robert Trinschek, Hamm (DE); Tomasz Kordecki, Hamm (DE); Frank Klein, Langenberg (DE); Ralf Rehbein, Hamm (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 14/197,862

(22) Filed: Mar. 5, 2014

(65) Prior Publication Data

US 2014/0252977 A1 Sep. 11, 2014

(30) Foreign Application Priority Data

Mar. 5, 2013 (EP) ...................................... 13157850

(51) Int. Cl.
*B60Q 1/14* (2006.01)
*H05B 33/08* (2006.01)

(52) U.S. Cl.
CPC ....... *H05B 33/0815* (2013.01); *H05B 33/0845* (2013.01); *H05B 33/0851* (2013.01); *Y02B 20/347* (2013.01)

(58) Field of Classification Search
CPC .................................................. B60Q 3/0286
USPC ........ 315/77, 291, 307, 308; 307/10.1, 10.8; 362/471
See application file for complete search history.

(56) References Cited

U.S. PATENT DOCUMENTS

| 6,161,910 | A | 12/2000 | Reisenauer et al. |
| 8,183,790 | B2 * | 5/2012 | Roebke ........................ 315/291 |
| 8,339,070 | B2 * | 12/2012 | Lai ................................ 315/311 |
| 8,547,017 | B2 * | 10/2013 | Salter et al. ..................... 315/77 |
| 2008/0130288 | A1 | 6/2008 | Catalano et al. |
| 2009/0267538 | A1 * | 10/2009 | Mantovani ..................... 315/297 |
| 2010/0039046 | A1 | 2/2010 | Roebke |

OTHER PUBLICATIONS

European Search Report for Application No. 13157850.2-1802. Mailed Aug. 16, 2013. 4 pages.

* cited by examiner

*Primary Examiner* — Thuy Vinh Tran
(74) *Attorney, Agent, or Firm* — Cantor Colburn LLP

(57) ABSTRACT

A dimmable LED reading light unit includes a dimming module and an LED module, connected in series. The dimming module has an input being connectable to a power supply supplying direct voltage and includes a potentiometer allowing section of a dimming rate and a current controller providing an operating current for the LED module. The LED module includes at least one LED and a current consumer connected in parallel and the current controller is configured to supply direct current to the LED module that substantially corresponds to the sum of the driving current necessary for driving the at least one LED to emit light with an intensity of illumination corresponding to the dimming rate of the potentiometer, and the current consumption of the current consumer.

14 Claims, 2 Drawing Sheets

Figure 1:
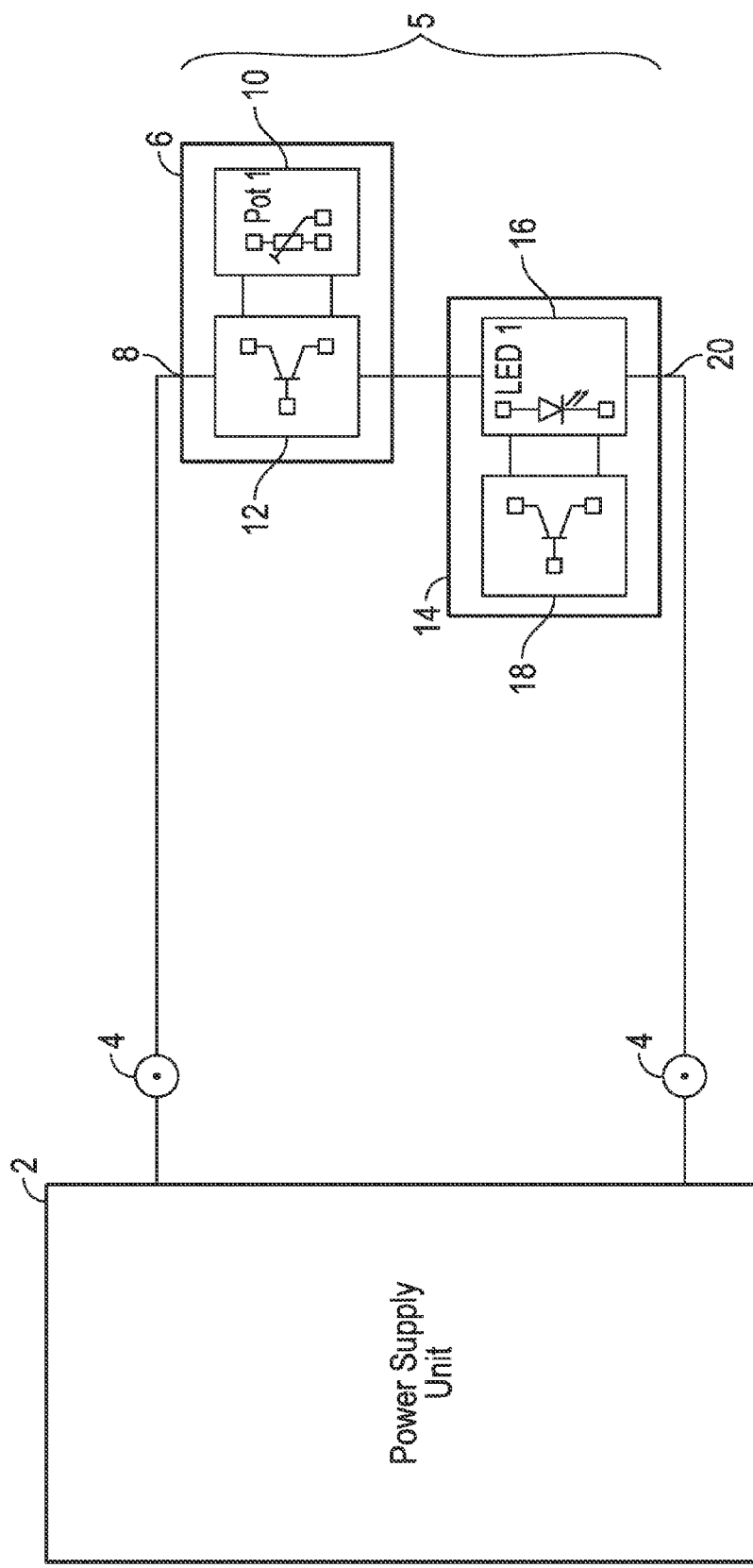

DIMMABLE LED READING LIGHT UNIT, ARRANGEMENT OF POWER SUPPLY AND DIMMABLE LED READING LIGHT UNIT AND METHOD OF REPLACING A DIMMABLE LIGHT UNIT BY A DIMMABLE LED READING LIGHT UNIT

CROSS REFERENCE TO RELATED APPLICATIONS

This application claims priority to European Patent Application No. 13 157 850.2 filed Mar. 5, 2013, the entire contents of which is incorporated herein by reference.

The invention relates to interior lighting systems for a passenger transportation vehicle such as an airplane, a ship, a bus, or a railcar and, in particular a dimmable LED reading light unit for such passenger transportation vehicle.

In passenger transportation vehicles, such as an airplane, a ship, a bus, or a railcar, halogen lights have been used as seat or reading lights. Due to their limited light yield and their comparably high power consumption, there is a tendency of replacing existing halogen lights by modern LED lights that have a higher light yield and lower power consumption.

However, in many cases it is not possible to adapt the existing power supply units in such passenger transportation vehicles, for example in airplanes, to the changed needs of LEDs that a replacement of a halogen light by an LED light brings with it. Such adaptation would be costly and cumbersome.

Further, the functionality of the light to be capable of being dimmed in order to emit visible light with a light intensity selected and desired by a passenger must be maintained.

Accordingly, it would be beneficial to provide a dimmable LED reading light unit having a high efficiency to replace existing halogen lights without changing the power supply unit. Further, it would be beneficial to facilitate such replacement as much as possible while keeping the wiring of the system.

Exemplary embodiments of the invention include a dimmable LED reading light unit, in particular for a passenger transportation vehicle, such as an airplane, a bus, a ship or a railcar, comprising a dimming module and an LED module, connected in series; the dimming module having an input being connectable to a power supply supplying direct voltage, the dimming module comprising a potentiometer allowing to select a dimming rate and a current controller providing an operating current for the LED module, the operating current corresponding to the dimming rate of the potentiometer; the LED module comprising at least one LED and a current consumer connected in parallel; wherein the current controller is configured to supply direct current to the LED module that substantially corresponds to the sum of the driving current necessary for driving at least one LED to emit light with an intensity of illumination corresponding to the dimming rate of the potentiometer, and the current consumption of the current consumer.

Exemplary embodiments of the invention further include an arrangement of a power supply and a dimmable LED reading light unit for use in a passenger transportation vehicle, such as an airplane, a bus or a ship or a railcar; wherein the dimmable LED reading light unit is a dimmable LED reading light unit as explained above; and wherein the input of the dimming module is connected to a first power supply line of the power supply unit and the output of the LED module is connected to a second power supply line of the power supply unit.

Exemplary embodiments of the invention further include a method of replacing a dimmable light unit, in particular a potentiometer and a halogen light, in a power supply system, in particular in a passenger interface and supply adapter of a passenger transportation vehicle, such as an airplane, a bus, a ship or a railcar, by a dimmable LED reading light unit as explained above, the method comprising the steps of: disconnecting the dimmable light unit from the power supply and ground lines of the power supply system; and connecting the power supply line of the power supply system to the input of the dimming module of the dimmable LED reading light unit and connecting the output of the LED module of the dimmable LED reading light unit to the ground line of the power supply system.

The dimmable LED reading light unit, according to exemplary embodiments of the invention, has a higher light yield and requires less electrical power as compared to conventional halogen light units. Furthermore, the dimmable LED reading light unit requires only very little maintenance since its elements normally have a long lifetime. Therefore, significant costs savings in the operation and the maintenance of the dimmable LED reading light unit can be realized.

By the dimmable LED reading light unit, according to exemplary embodiments of the invention, existing light units, particularly existing halogen light units can be replaced quickly, easily and reliably without having to change the wiring of the system.

The dimmable LED reading light unit can be operated and dimmed reliably by using only one wire, namely the line coming from the potentiometer output supplying direct voltage and the ground line.

Moreover, the power supply that normally supplies a constant voltage of at least 20 VDC, for example 28 VDC can be used and the entire dimming range of the potentiometer between 0%, corresponding to an off state, and 100%, corresponding to the full luminous flux, can be used.

By a dimmable LED reading light unit or a dimmable LED seat light unit, according to exemplary embodiments of the invention, also dimmable LED light units are to be understood that emit light with an intensity of illumination suitable for reading, no matter if such dimmable LED light units are in fact used for reading.

According to the findings of the inventors, the dimming module comprising the current controller and the potentiometer generates an operating current if the selected dimming rate of the potentiometer is 0% corresponding to an off-state of the at least one LED, which operating current is required by the dimming module and particularly by the potentiometer to be able to function. Such current would drive an LED connected in series to emit light which is not desired. Therefore, the inventors have provided in the LED module a current consumer that is connected in parallel to the at least one LED which acts as a current bypass or current sink and consumes that part of the current generated by the dimming module that is not used for driving the at least one LED. Further, the current controller is configured that its supplies in operation a direct current to the LED module that substantially corresponds to the sum of the driving current necessary for driving at least one LED to emit light with an intensity of illumination corresponding to the dimming rate selected at the potentiometer and the current consumption of the current consumer.

The current controller can be coupled to the potentiometer such that the output voltage of the potentiometer having a voltage intensity corresponding to the selected dimming rate is used for controlling the current controller such that the current controller outputs current as explained herein.

The current controller can be configured such that the position/dimming rate of the potentiometer is determined and a constant driving current corresponding to the selected dimming rate plus the current to be consumed by the current consumer is generated and supplied to the LED module.

According to a first embodiment, the current controller is configured to supply, if the dimming rate of the potentiometer corresponds to 0%, direct current to the LED module that corresponds substantially to the current consumption of the current consumer such that at least one LED remains dark. By such embodiment, it is ensured that the LED is switched off safely and only starts to emit light if the dimming rate of the potentiometer is greater than 0%.

According to a further embodiment, the current controller is configured to supply, if the dimming rate of the potentiometer corresponds to 100%, direct current to the LED module substantially corresponds to the sum of the nominal driving current necessary for driving at least one LED to emit light with an intensity of illumination corresponding to 100%, and the current consumption of the current consumer. By this embodiment it is ensured that at least one LED is driven to emit light with full brightness and the maximum nominal illumination is reached by at least one LED, if the dimming rate of 100% is selected at the potentiometer.

According to a further embodiment, the input of the potentiometer and the current controller are connected in parallel. In this way the potentiometer can be supplied with the full direct voltage provided by a power supply. The output of the potentiometer can be connected to the current controller itself in order to enable the current controller to determine the dimming rate selected at the potentiometer.

According to a further embodiment, the dimming module and the LED module are connected in series. The output of the dimming module, particularly of the current controller is connected to the input of the LED module which branches into a first parallel line leading to at least one LED and into a second parallel line leading to the current consumer.

According to a further embodiment of the invention, the current consumer is a resistor. In a simple embodiment the resistor is chosen such that it consumes the current being generated by the dimming module if the potentiometer position corresponds to 0%.

By choosing, as current consumer, other elements like a transistor or an integrated circuit, the same function of a resistor can be achieved, but it is also possible to provide the functionality of adapting the current consumption should this be needed, for example as a consequence of a changing output current of the dimming module, at the potentiometer position of 0%.

According to a further embodiment, the current controller comprises a control current supply or a transistor.

According to a further embodiment the LED module comprises, in series, two or more pairs of LED and current consumer, respectively connected in parallel. By this embodiment a higher intensity of illumination can be attained.

According to a further embodiment of the invention, the current controller is configured to supply direct current to the LED module by pulse width modulation. In this embodiment the duty factor/duty cycle or in other words the ratio between the phases can be adapted such that the at least one LED emits light with a luminous flux corresponding to the determined dimming rate of the potentiometer.

According to an alternative embodiment, the current controller is configured to supply the direct current to the LED module with a current intensity corresponding to the sum of the driving current necessary for at least one LED to emit light with an intensity of illumination corresponding to the selected dimming rate, and the current consumption of the current consumer. This is also called linear LED control.

According to a further embodiment, the number of pairs of LED and current consumer, connected in parallel, is selected such that the operating voltage of the dimming module plus the number of pairs of LED and current consumer times the forward voltage of each LED corresponding to the nominal direct current driving the LED to emit light with an intensity of illumination of 100% is lower than the direct voltage supplied by the power supply. Each of such pairs consists of at least one LED and one current consumer, connected in parallel. By this embodiment, the maximum intensity of illumination can be get out of the direct voltage supplied by the power supply.

According to a further embodiment, the dimmable LED reading light unit comprises an output connectable to a ground line of the power supply.

According to a further embodiment, the dimmable LED reading light unit further comprises a housing enclosing, at least partly, the dimming module and the LED module. In this embodiment, the dimmable LED reading light unit is reliably protected, and an easy replacement of existing dimmable light units by dimmable LED reading light units is made possible.

For the arrangement of a power supply and a dimmable LED reading light for use in a passenger transportation vehicle, according to exemplary embodiments of the invention, and for the method of replacing a dimmable light unit in a power supply system by a dimmable LED reading light unit, according to exemplary embodiments of the invention, the same advantages and embodiments as explained with respect to the dimmable LED reading light unit apply, and they are herewith incorporated by reference without repeating them again for brevity.

Figure 2:
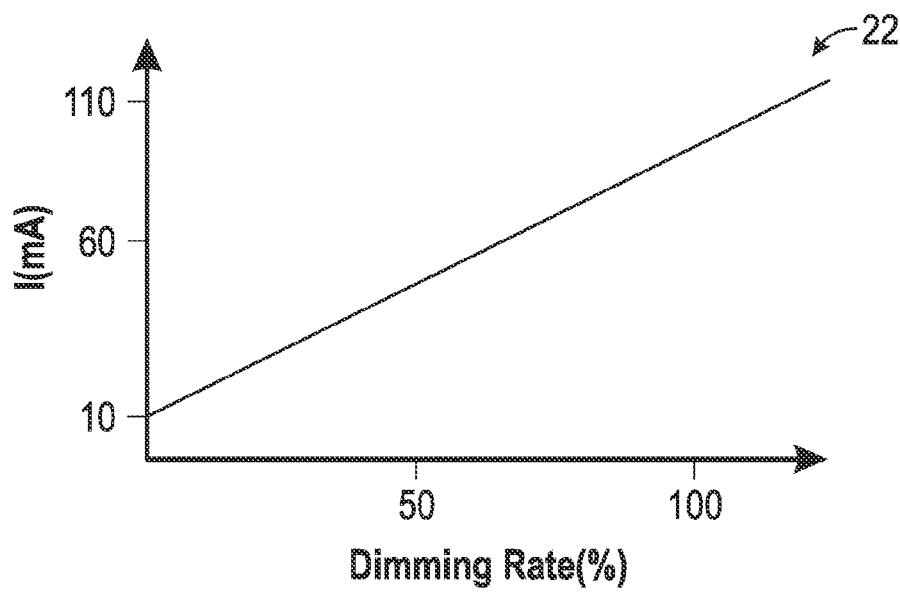
Figure 2:
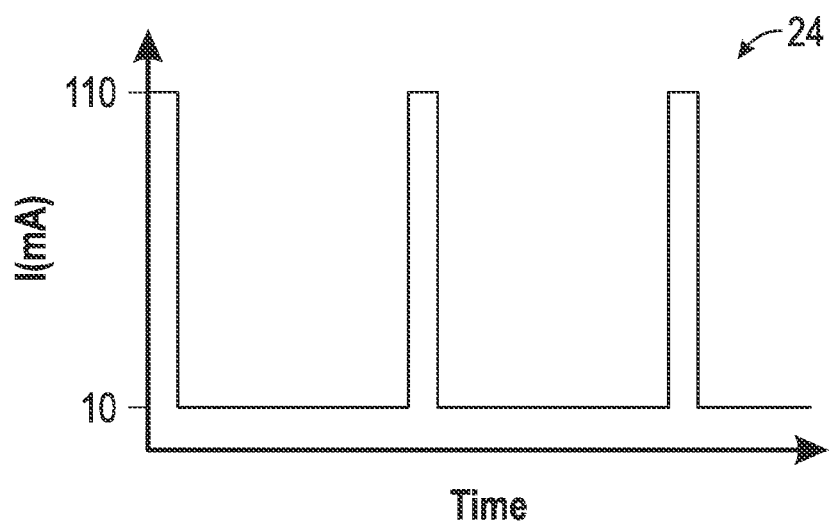

Embodiments of the invention are described in greater detail below with reference to the figures, wherein:

FIG. 1 is a schematic diagram of a power supply unit of an airplane and a dimmable LED reading light unit comprising a dimming module and a light module, according to an embodiment of the present invention;

FIG. 2 depicts a first diagram showing the output current of the dimming module of the dimmable LED reading light unit of FIG. 1 over a selected dimming rate according to an embodiment of the present invention using linear control; and a second diagram showing the course of an output current of the dimming module of the dimmable LED reading light unit of FIG. 1 over time for a selected exemplary dimming rate according to an embodiment of the present invention using pulse width modulation control.

FIG. 1 shows, according to an exemplary embodiment of the present invention, a schematic diagram of a power supply unit 2 to which a dimmable LED reading light unit 5 comprising a dimming module 6 and an LED module 14 are connected via power supply connections 4.

The power supply unit 2 provides a direct voltage, which is substantially constant and which can be for example 28 VDC, over the power supply connections 4. One or more reading light units of an airplane and other components disposed in a so-called passenger service unit PSU can be connected to the power supply connections 4. The power supply unit 2 is sometimes also called "the passenger interface and supply adapter" PISA.

In the present embodiment, for simplicity, only one reading light unit that is connected to the power supply unit 2 via the power supply connections 4 is shown. This reading light unit is formed as a dimmable LED reading light unit 5 comprising a dimming module 6 and an LED module 14 connected in series.

Via the upper power supply connection 4, a constant voltage of for example 28 VDC is supplied and the lower power supply connection 4 forms a ground line.

In FIG. 1, a halogen light unit, particularly a halogen light unit comprising a potentiometer and an halogen light (not shown) has been replaced by the dimmable LED reading light unit 5. For replacing the halogen light unit by the dimmable LED reading light unit 5, it is only required to connect the upper power supply connection 4 to the input 8 of the dimming module 6 of the dimmable LED reading light unit 5 and to connect the output of the LED module 14 of the dimmable LED reading light unit 5 to the ground line 4. No other changes in the power supply 2 or in the power supply connections 4 have to be made.

The dimming module 6 comprises an input 8 that is connected or connectable to the upper power supply connection 4, a current controller 12 that is connected to a potentiometer 10 and that can also be called direct current converting unit, and an output that is connected to the input of the LED module 14.

The potentiometer 10 is supplied with a direct voltage, which is substantially constant and which can be for example 28 VDC, from the power supply unit 2. For this purpose, one input of the potentiometer 10 is connected to the upper power supply connection 4.

A passenger, a cabin attendant, a pilot or another person can select or adjust a desired dimming rate at the potentiometer 10, and the output voltage of the potentiometer 10 having a voltage intensity corresponding to the selected dimming rate is used for controlling the current controller 12, that in turn provides an operating current for the LED module 14, which operating current corresponds to the dimming rate of the potentiometer 10 selected.

The current controller 12 is configured such that the position/dimming rate of the potentiometer 10 is determined and a constant driving current corresponding to the selected dimming rate plus the current to be consumed by the current consumer 18, as will be explained in detail below, is generated and supplied to the LED module 14.

The LED module 14 comprises, in the present non-limiting embodiment of FIG. 1, one pair of an LED and a current consumer 18. Further, the LED module 14 comprises an input connected to the output of the dimming module 6 and an output 20 connected or connectable to the ground line 4.

In an alternative embodiment (not shown) two or more pairs of LED and current consumer, respectively connected in parallel, can be provided, which pairs of LED and current consumer can be arranged in series. Each of such pairs consists of at least one LED and one current consumer, connected in parallel. The number of pairs of LED and current consumer can be such that the operating voltage of the dimming module 6 plus the number of pairs of LED and current consumer times the forward voltage for each LED corresponding to the nominal direct current driving the LED to emit light with an intensity of illumination of 100% is lower than or corresponds to the direct voltage supplied by the power supply 2.

According to the findings of the inventors, the dimming module 6 generates an operating current of for example 10 mA, if the selected dimming rate of the potentiometer 10 is 0%, which would drive an LED connected in series to emit light which is not desired. Such operating current is required by the potentiometer 10 to be able to function.

Therefore, the inventors have provided, in the LED module 14, a current consumer 18 that is connected in parallel to the LED 16. Such current consumer 18 can also be called current bypass or current sink and consumes that part of the current generated by the dimming module 6 that is not to be used for driving the LED 16 and in particular that amount of current that is still flowing from the dimming module 6, if the selected dimming rate of the potentiometer 10 is 0%.

Further, the inventors have configured the current controller 12 such that it supplies, in operation, direct current to the LED module 14 that substantially corresponds to the sum of the driving current necessary for driving the LED 16 to emit light with an intensity of illumination corresponding to the dimming rate selected at the potentiometer 10, and the current consumption of the current consumer 18. By the provision of such dimming module 6 and such LED module 14 the LED 16 of the LED module 14 can be operated and dimmed corresponding to the dimming rate selected at the potentiometer 10 of the dimming module 6. If the dimming rate of the potentiometer 10 corresponds to 0%, the current controller 12 supplies direct current to the LED module 14 that corresponds substantially to the current consumption of the current consumer 18 and the LED 16 remains dark. In this situation, the current generated by the current controller 12 when the dimming rate of the potentiometer 10 corresponds to 0% (off state) bypasses the LED 16 14 through the current consumer 18 and is consumed there.

If the dimming rate of the potentiometer 10 corresponds to 100%, the current controller 12 supplies direct current to the LED module 14 that substantially corresponds to the sum of the nominal driving current necessary for driving the LED 16 to emit light with an intensity of illumination corresponding to 100%, and the current consumption of the current consumer 18.

In one embodiment, the current consumer 18 is a resistor. Assuming, as one example, that the current flowing from the dimming module 6 to the light module 14 is 10 mA, if the selected dimming rate of the potentiometer 10 is 0%, and that the voltage between the output of the dimming module 6 and the ground line 4 is 3V, the resistance value of the resistor would have to be selected to be R=U/I=3V/10 mA=300Ω.

In other embodiments, the current consumer 18 can be a transistor or an appropriate integrated circuit.

The output current over selected dimming rate diagram 22 of FIG. 2 visualizes the current generated by the current controller 12 over a dimming rate, using linear current control.

The dimming rate depicted on the x-axis can be selected through the potentiometer 10, for example by a passenger, a cabin attendant or a pilot. The diagram of FIG. 2 shows a straight line between 10 mA at 0% dimming rate and 110 mA at 100% dimming rate.

If the dimming rate is 0% the operating current generated by the current controller 12 is 10 mA. Such current bypasses the LED 16 via the current consumer 18 and is consumed there such that the LED 16 remains dark.

If a dimming rate of 100% is selected at the potentiometer 10 the current controller 12 supplies a current of 110 mA to the LED module 14. The part of such current corresponding to 10 mA continues to bypass the LED 16 via the current consumer 18 and to be consumed there and the other part of 100 mA drives the LED 16 to emit light with an intensity of illumination corresponding to 100% which corresponds to the nominal driving current for driving the LED with a desired full intensity of illumination.

In other words, the current controller 12 always supplies current to the LED module 14 that bypasses the LED 16 and is consumed by the current consumer 18 and current for driving the LED 16 to emit light with an intensity of illumination corresponding to the dimming rate selected through the potentiometer 10.

The output current over time diagram 24 of FIG. 2 visualizes the course of current generated by the current controller 12 over time, using pulse with modulation, for an exemplary dimming rate of 10% selected through the potentiometer 10.

Phases with a driving current of 110 mA change at fast pace with phases with a current of 10 mA. Diagram 24 depicts a ratio of such phases corresponding to a light intensity of 10% of the LED 16 plus the current consumption of 10 mA for the current consumer 18. The duty factor/duty cycle which is the ratio between such phases can be adapted by the current controller 12 such that the LED 16 emits light corresponding to the dimming rate selected by means of the potentiometer 10.

At this point let it be said with regard to the embodiments of FIG. 2 that the two ways of adjusting the current by the current controller 12 as depicted in FIG. 2 are only two of many possibilities.

While the invention has been described with reference to exemplary embodiments, it will be understood by those skilled in the art that various changes may be made and equivalence may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed, but that the invention will include all the embodiments falling within the scope of the appended claims.

The invention claimed is:

1. A dimmable LED reading light unit, in particular for a passenger transportation vehicle, comprising:
    a dimming module and an LED module, connected in series; and
    the dimming module having an input being connectable to a power supply supplying direct voltage, the dimming module comprising a potentiometer allowing to select a dimming rate and a current controller providing an operating current for the LED module, the operating current corresponding to the dimming rate of the potentiometer;
    the LED module comprising at least one LED and a current consumer connected in parallel;
    wherein the current controller is configured to supply direct current to the LED module that substantially corresponds to the sum of the driving current necessary for driving the at least one LED to emit light with an intensity of illumination corresponding to the dimming rate of the potentiometer, and the current consumption of the current consumer;
    wherein, in the dimming module, the potentiometer and the current controller are connected in parallel such that the potentiometer is supplied with the full direct voltage provided by the power supply, and the current controller is enabled to determine the dimming rate selected at the potentiometer.

2. The dimmable LED reading light unit according to claim 1, wherein, if the dimming rate of the potentiometer corresponds to 0%, the current controller is configured to supply direct current to the LED module that corresponds substantially to the current consumption of the current consumer such that the at least one LED remains dark.

3. The dimmable LED reading light unit according to claim 2, wherein, if the dimming rate of the potentiometer corresponds to 100%, the current controller is configured to supply direct current to the LED module that substantially corresponds to the sum of the nominal driving current necessary for driving the at least one LED to emit light with an intensity of illumination corresponding to 100%, and the current consumption of the current consumer.

4. The dimmable LED reading light unit according to claim 1, wherein the current consumer is a resistor, a transistor or an integrated circuit.

5. The dimmable LED reading light unit according to claim 1, wherein the current controller comprises a controlled current supply or a transistor.

6. The dimmable LED reading light unit according to claim 1, wherein the LED module comprises, in series, two or more pairs of LED and current consumer, respectively connected in parallel.

7. The dimmable LED reading light unit according to claim 1, wherein the current controller is configured to supply direct current to the LED module by pulse width modulation.

8. The dimmable LED reading light unit according to claim 1, wherein the current controller is configured to supply direct current to the LED module with a current intensity corresponding to the sum of the driving current necessary for the at least one LED to emit light with an intensity of illumination corresponding to the selected dimming rate, and the current consumption of the current consumer.

9. The dimmable LED reading light unit according to claim 1, wherein a number of pairs of LED and current consumer, respectively connected in parallel, is selected such that the minimum operating voltage of the dimming module plus the number of pairs of LED and current consumer times the forward voltage for each LED corresponding to the nominal direct current driving the LED to emit light with an intensity of illumination of 100% is lower than the direct voltage supplied by the power supply.

10. The dimmable LED reading light unit according to claim 1, further comprising an output connectable to a ground line of the power supply.

11. The dimmable LED reading light unit according to claim 1, further comprising a housing enclosing, at least partly, the dimming module and the LED module.

12. An arrangement of a power supply and a dimmable LED reading light unit for use in a passenger transportation vehicle;
    wherein the dimmable LED reading light unit is a dimmable LED reading light unit according to claim 1; and
    wherein the input of the dimming module is connected to a first power supply line of the power supply and the output of the LED module is connected to a second power supply line of the power supply.

13. A method of replacing a dimmable light unit, the method comprising the steps of:
    disconnecting the dimmable light unit from a power supply and ground lines of a power supply system; and connecting the power supply line of the power supply system to an input of a dimming module of a dimmable LED reading light unit and connecting an output of the LED module of the dimmable LED reading light unit to the ground line of the power supply system;

wherein the dimmable LED reading light unit includes:

a dimming module; and an LED module, connected in series with the dimming module; and the dimming module having an input being connectable to a power supply supplying direct voltage, the dimming module comprising a potentiometer allowing to select a dimming rate and a current controller providing an operating current for the LED module, the operating current corresponding to the dimming rate of the potentiometer;

the LED module comprising at least one LED and a current consumer connected in parallel;

wherein the current controller is configured to supply direct current to the LED module that substantially corresponds to the sum of the driving current necessary for driving the at least one LED to emit light with an intensity of illumination corresponding to the dimming rate of the potentiometer, and the current consumption of the current consumer;

wherein, in the dimming module, the potentiometer and the current controller are connected in parallel such that the potentiometer is supplied with the full direct voltage provided by the power supply, and the current controller is enabled to determine the dimming rate selected at the potentiometer.

14. A dimmable LED reading light unit, in particular for a passenger transportation vehicle, comprising:

a dimming module and an LED module, connected in series; and the dimming module having an input being connectable to a power supply supplying direct voltage, the dimming module comprising a potentiometer allowing to select a dimming rate and a current controller providing an operating current for the LED module, the operating current corresponding to the dimming rate of the potentiometer;

the LED module comprising at least one LED and a current consumer connected in parallel, the current consumer forming a current bypass or current sink consuming that amount of current that is still flowing from the dimming module (6), if a selected dimming rate of the potentiometer is 0%;

wherein the current controller is configured to supply direct current to the LED module that substantially corresponds to the sum of the driving current necessary for driving the at least one LED to emit light with an intensity of illumination corresponding to the dimming rate of the potentiometer, and the current consumption of the current consumer bypassing the at least one LED;

wherein, in the dimming module, the potentiometer and the current controller are connected in parallel such that the potentiometer is supplied with the full direct voltage provided by the power supply, and the current controller is enabled to determine the dimming rate selected at the potentiometer.

* * * * *